Oct. 29, 1963   J. L. SNYDER   3,109,169
OPTICAL SYSTEM FOR RADAR STRIP MAP RECORDER
Filed Jan. 6, 1960   4 Sheets-Sheet 1

INVENTOR
John L. Snyder
BY Stevens, Davis, Miller & Mosher
ATTORNEYS

Oct. 29, 1963   J. L. SNYDER   3,109,169
OPTICAL SYSTEM FOR RADAR STRIP MAP RECORDER
Filed Jan. 6, 1960   4 Sheets-Sheet 3

INVENTOR
*John L. Snyder*

BY *Stevens, Davis, Miller & Mosher*
ATTORNEYS

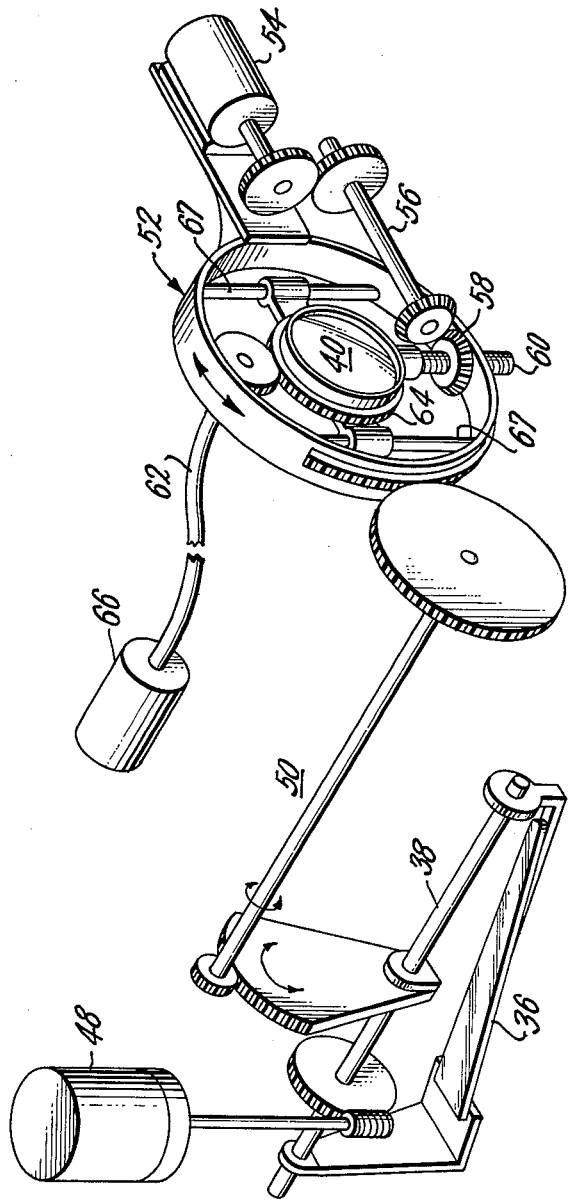

United States Patent Office 3,109,169
Patented Oct. 29, 1963

3,109,169
OPTICAL SYSTEM FOR RADAR STRIP
MAP RECORDER
John L. Snyder, Dallas, Tex., assignor to Texas Instruments Incorporated, Dallas, Tex., a corporation of Delaware
Filed Jan. 6, 1960, Ser. No. 900
6 Claims. (Cl. 343—5)

The present invention relates to airborne ground mapping apparatus and, more particularly, to an optical system adapted to correct for deviations by a flight platform from a normal flight attitude.

Generally, known airborne ground mapping apparatus do not utilize a method for correcting for pitch and yaw by optical means alone. In several known methods, corrections for pitch and yaw are electronically made within a cathode ray tube to present a corrected trace. Several methods prevent distortion of the trace due to rolling of the aircraft by electrically stabilizing P.P.I. (plan position indicator) images against rotational oscillations relative to the direction-signifying axes of the indicator-face. The electrical stabilization is accomplished despite the oscillatory rotational changes of the radar transmitting antenna relative to the ground, or scanned area, of the airborne vehicle. This method of correcting for pitch and yaw requires a rather complex mechanism with its related maintenance problems. The principal disadvantage of the system of the prior art is the deterioration of focus of the trace on the face of the C.R.T. In mapping radar, high degrees of resolution are necessary. As the C.R.T. used normally has a flat face in order that the image may be focused optically, means must be provided for maintaining focus across the entire sweep of the cathode ray tube. If corrections are made by moving the trace on the face of the cathode ray tube, then the field curvature will aggravate the electrical focusing problem and cause a deterioration in resolution. Also, due to variations in the electrical parameters, the electrical correction will normally not be as accurate as the corrections obtained utilizing an optical system.

The present invention, in its preferred form, comprises an optical system operatively associated with mapping apparatus which prevents distortion or blurring of photographs taken by the airborne radar camera. Briefly, in a radar mapping apparatus, the transmitted pulse reflected back to the radar receiver is presented or indicated on a cathode ray tube in the form of a non-rotating single line of variable intensity. This line is projected on a slowly moving strip of film, and as the film moves along, a picture is formed of the terrain over which the aircraft is traveling.

In a common form of the C.R.T. display, there are two traces corresponding to the radar-received signals from a pair of left and right antennas on the aircraft. However, aircraft disturbances cause the vehicle to deviate from a predetermined attitude.

As the aircraft deviates from a predetermined flight attitude, in drift, pitch, and yaw, the resultant trace cannot be used for mapping purposes without correction for these undesirable flight conditions. In the present invention, correction is obtained by optically rotating the single line of variable intensity obtained from the C.R.T. in an amount equal to the drift angle and translating it as a function of the angle-of-pitch and the altitude of the aircraft. The rotation of the line image is accomplished by a unique method that can be applied to any application where the image of a line is to be rotated about a point not on the line and where the extended line must pass through the point.

For the purpose of the present disclosure, pitch is defined as the product of the altitude of the aircraft and the tangent of the pitch angle. The pitch angle is defined as the angle formed between the ground vertical line and the vertical axis of the aircraft wherein the line and axis are in the same longitudinal plane of the aircraft so that whenever the aircraft is horizontal to the ground, the vertical axis of the aircraft coincides with the vertical line to the ground. Yaw is a flight condition wherein the aircraft rotationally oscillates about its vertical axis and drift is defined as the angle between the heading of the aircraft and the true course at the ground speed. In general, it is desirable to orient the information embodied in the C.R.T. line images with respect to the true course of the aircraft while the film is moving proportional to the ground speed and to provide correction for pitch and yaw to prevent double exposure (of the photographed area) on the film.

The optical system disclosed herein performs three functions, which are to rotate the C.R.T. image to correct for drift and yaw, to translate this image to correct for pitch of the aircraft, and to put the image of the C.R.T. trace on the film. Specifically, the present invention uses a separate lens for each C.R.T. employed and incorporates pivoted mirrors mounted close to the respective tube faces. Each mirror rotates about an axis that is colinear with the C.R.T. trace, and the mirror surface makes an angle of approximately 45° with its axis of rotation. This portion of the system will correct for yaw while the pitch correction is introduced by moving the lens to translate the line image of each trace in a direction perpendicular to itself. This function is provided by rotating a ring to correspond with the drift angle, and mounting the lens inside this ring for translation along a diameter thereof. The translation will correspond to the required correction for pitch. It would seem to be obvious that since the movements involved are small in magnitude, the system can be made extremely accurate and compact.

It is therefore one object of the present invention to provide an optical system for introducing drift and yaw corrections in an airborne ground mapping apparatus of the radar-optical type.

Another object is to provide an optical system for introducing drift, yaw, and pitch correction in an airborne ground mapping apparatus, wherein the corrections are obtained by moving lenses and mirrors automatically while the mapping process is in operation.

A further object of the invention is the provision of an optical system for use in conjunction with airborne radar ground mapping apparatus which will present an undistorted exposure of the ground target area on film.

Another further object is to provide a simple, reliable, and inexpensive optical system which may be applied to radar ground mapping equipment to correct for aircraft deviations from a predetermined flight condition.

Other objects and many of the attendant advantages of this invention will be readily appreciated as the same becomes better understood by reference to the following detailed description when considered in connection with the accompanying drawings in which like reference numerals designate like parts throughout the figure thereof and wherein:

FIGURE 4 is a functional illustration of the optical system showing the relationship between the drift angle and the pitch correction elements.

Figure 1:
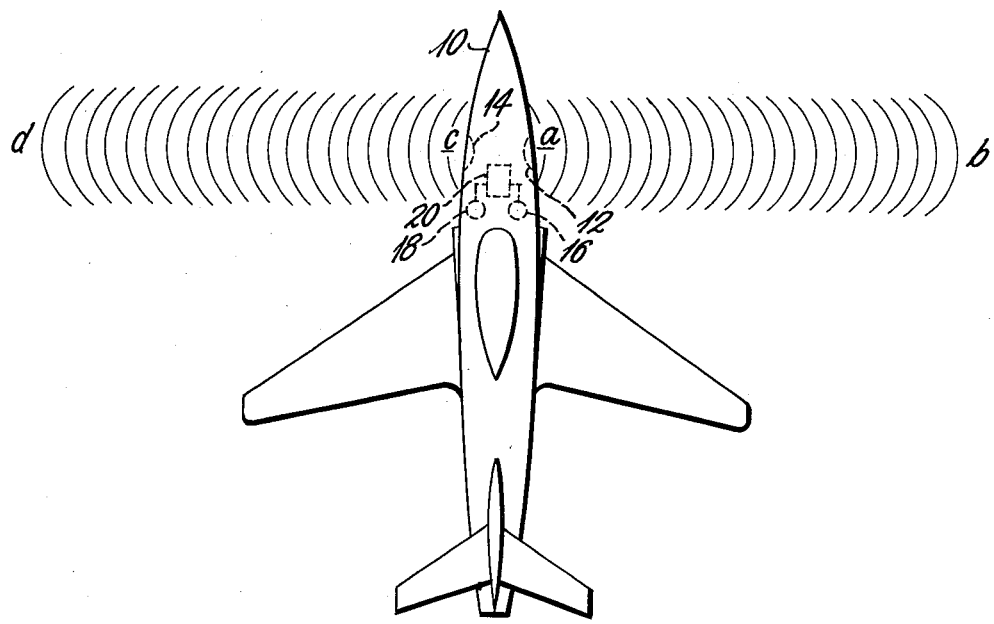
FIGURE 1 is a diagrammatic illustration in plan of an aircraft carrying a radar ground mapping camera to which the present invention may be applied.
Figure 1A:
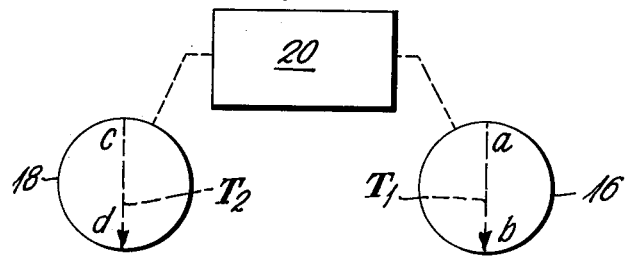
FIGURE 1a is a schematic diagram of the airborne camera with plan views of the cathode ray tube faces shown to illustrate partial ground traces corresponding to FIGURE 1.

Referring now to the drawings, FIGURE 1 schematically illustrates aircraft 10 equipped with a radar camera mapping apparatus 20 having a pair of radar antennas 12 and 14 for directing the radar beam toward the ground target areas on each side of the aircraft in flight. As indicated in the figure, antenna 12 would scan an area on the ground between points a and b, while antenna 14 would scan an area between c and d. While the plane 10 is in level flight, the pair of cathode ray tubes 16 and 18 in camera 20, shown diagrammatically in FIGURE 1a, would receive radar return signals resulting in vertical traces $T_1$ and $T_2$ corresponding, respectively, to ground lines a—b and c—d. These are exposed on the camera film. As the flight continues, successive exposures are made of ground traces on each side of the line of flight.

There are essentially two factors to take into account if double exposure of the film is to be prevented, namely, pitch and yaw of the aircraft. Pitch is illustrated in FIGURE 1c and is defined herein as the altitude of the aircraft times the tangent of pitch angle. Pitch will only become a significant factor if the forward speed of the aircraft is not great enough to compensate for it. Under such circumstances, the antenna ground illuminating and reflected beams a—b and c—d would move backwardly of the plane to ground target areas previously illuminated and exposed or photographed. Consequently, unless such re-exposures are compensated for in the camera mechanism to fall exactly on the previous exposures, the photographs will be blurred.

Figure 1B:
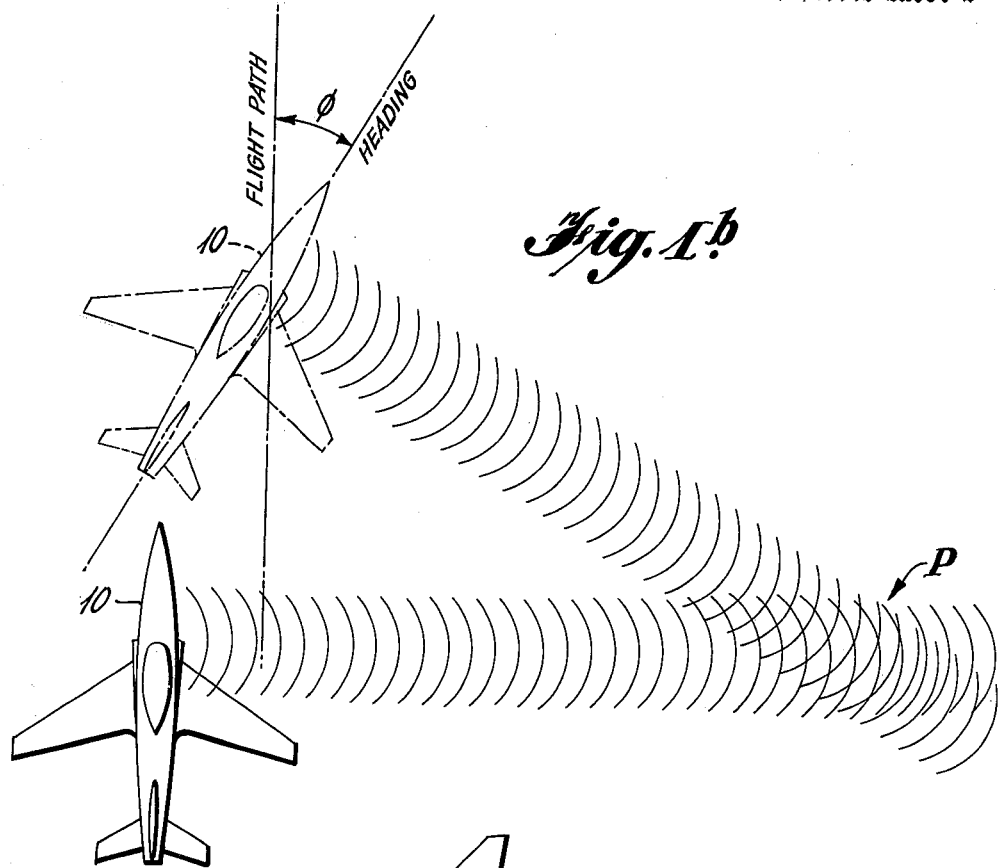
FIGURE 1b is a diagrammatic illustration of an aircraft showing the result of yawing, the aircraft being shown in solid lines when in straight level flight and in broken lines when yawing to the right.
Figure 1C:
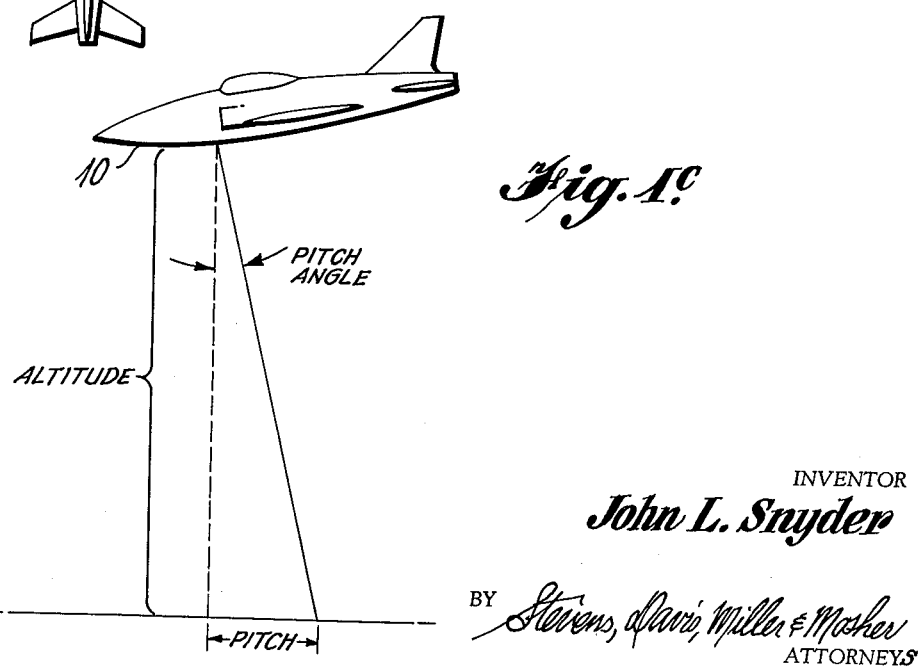
FIGURE 1c is a diagrammatic illustration showing pitch.

The effect of yaw is illustrated in FIGURE 1b. Again, the speed of the aircraft is an important consideration. As noted from the figure, the aircraft 10 is yawing toward the right and the paths of the radar beam illuminating ground areas, for the two positions shown, intersect at point P. Hence, only areas to the right of point P will be double exposed. The distance between the aircraft and point P is dependent upon the forward speed of the aircraft and its rate of yaw. Point P may be out of the range of the mapping radar, in which case no corrections or adjustments need be made. If point P is in radar range, then provision must be taken to prevent double exposure on the film of areas to the right of point P.

The effect of drift is also illustrated in FIGURE 1b and is defined as the angle $\phi$ between the heading of the aircraft and the actual flight path. As mentioned earlier, this correction is not made to prevent double exposure but to properly orient the scanned area with the true flight path.

Referring again to the drawings, there is illustrated a preferred embodiment 30, adapted for use with a radar camera mapping apparatus having a pair of radar antennas for directing radar beams toward the ground target areas from each side of an airborne vehicle.

Figure 2:
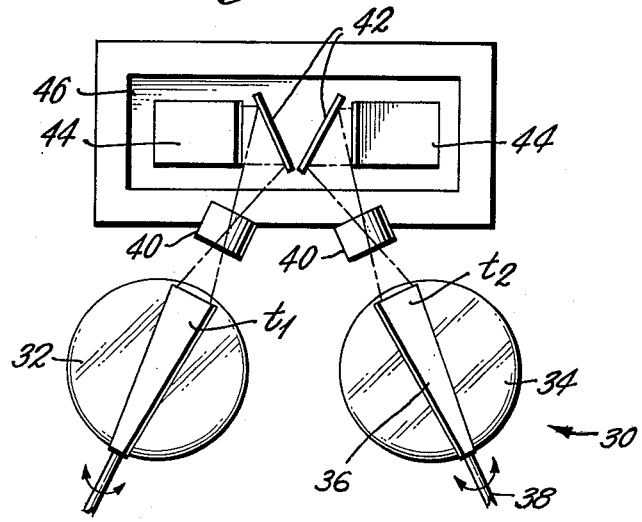
FIGURE 2 is a diagrammatic view of a preferred embodiment of the invention illustrating the optical system between the C.R.T. and the film.
Figure 3:
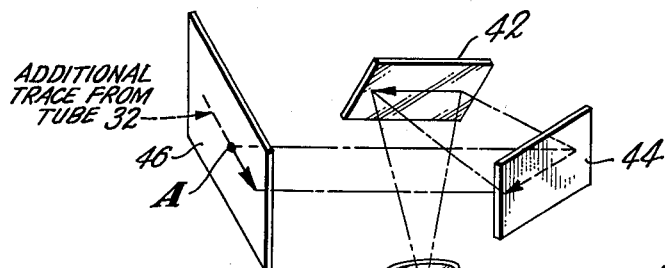
FIGURE 3 is another diagrammatic view of the optical system of FIGURE 1.
Figure 3:
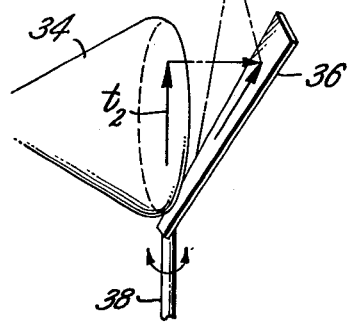

FIGURES 2 and 3 are diagrammatic views of the specifiic structural means illustrating the present invention. The preferred embodiment 30 is provided with a pair of conventional cathode ray tubes 32 and 34 adapted to display on their respective faces information corresponding to received radar signals. The C.R.T. displays 32 and 34 have two traces $T_1$ and $T_2$, respectively, corresponding to received signals from the left and right antennas of the aircraft. In FIGURE 2, a symmetrical system is illustrated, each C.R.T. being provided with its own lens and optical path. Since the system is symmetrical, only one optical path will be described.

Referring now to FIGURE 3, a mirror 36 is rotatively supported on an axis 38 at a predetermined angular relation to the shaft. The shaft 38 is rotatively mounted in a suitable supporting structure, not shown, so that the trace $T_2$ of the C.R.T. 34 will be in axial alignment with the shaft axis. A movable lens 40 is provided to focus the light from the trace therethrough to a stationary mirror 42 and, in turn, to another stationary mirror 44 and, finally, to a film 46.

In the operation of the present invention, the light from the trace on C.R.T. 34 is reflected from rotating mirror 36 through the sliding lens 40 and to the stationary mirror 42. Finally, the image light reflects from the other stationary mirror 44 to the film 46. The light from the C.R.T. 32 trace is reflected in the same manner and placed on the film 46 in axial alignment with the first trace.

As shown in FIGURE 4, a drift correction servo 48 drives the shaft 38 to rotate the mirror 36. Shaft 38 also drives a gear train 50 which rotates a ring lens housing 52, as hereinafter disclosed. A pitch correction servo 54 drives a shaft 56 and bevel gears 58, which are threadedly attached to a lead screw 60 fixed to the lens 40 for movement of the lens 40 along shafts 67 on a diameter of the ring housing 52. A servo motor 66 varies the aperture of lens 40 as the rate at which the film is pulled varies, by driving flexible shaft 62 which causes the iris ring gear 64 to change the lens aperture. The rate at which the film is pulled is varied as the ground speed varies by means not shown.

Drift or yawing of the aircraft will be detected by the normal aircraft instruments. When the yawing or drift is detected, a drift correction signal is applied by manual means or automatic input means to the drift correction servo 48. The drift correction servo 48, in response to the drift correction signal, drives the drive shaft 38 which rotates the mirror 36 directly and causes the gear train 50 to rotate the lens housing 52. The drift and yaw correction is made by the rotation mirror 36. The rotation of mirror 36 causes the trace placed on the film 46 to be rotated about point A. In the absence of yaw or drift the radars will scan along a line perpendicular to the actual flight path. The effect of drift and yaw is to cause one radar to scan what has been previously scanned. The other radar will scan ahead of the line perpendicular to the flight path. By rotating the trace placed on the film 46 about point A, part of the trace will re-expose an already exposed portion of the film while the other half of the trace will swing ahead in the same manner that one of the radars will scan ahead.

The pitch correction servo 54 upon receiving a pitch correction signal applied by manual or automatic input means, drives shaft 56 and the beveled gears 58 for translating the lens 40 along the shafts 67 in response to the pitch correction signal. The effect of pitching is to cause the radars to scan behind the plane if the plane pitches nose down and to scan ahead of the plane if the plane pitches nose up. If the trace placed on the film 46 would fall across point A for level flight, it is seen that by translating the lens 40 the trace is effectively moved to re-expose a portion of this film if the plane pitches nose down or to expose the film ahead of that normally exposed if the plane pitches nose up. If pitch and drift or yaw occur simultaneously, it is necessary that the pitch correction cause the trace to move along a line perpendicular to the trace. As the drift servo 48 causes the lens housing 52 to rotate through an angle which corresponds to the drift angle, the lens 40 will always move perpendicular to the trace.

In conclusion, the present invention uses a separate lens for each C.R.T. and operates two pivoted mirrors mounted close to the tube face, as shown in FIGURES 2 and 3. The mirror 36 rotates about an axis that is colinear with the trace on the face of each of the tubes. The surface of the mirror 36 makes an angle of approximately 45° with its axis of rotation. Correction for drift and yawing is made by rotating mirror 36. The pitch correction is introduced by moving the lens 40 along an axis that is perpendicular to the drift angle. The lens ring housing 52 is rotated through an angle corresponding to the drift angle. The lens is mounted within the ring housing and translated along a diameter thereof, so that the translation will correspond to the required correction for pitch. Since the movements involved in the optical system are small, the system can be made very accurate and compact.

The present dual lens optical system permits use of a shorter optical path length for a given lens field angle. A very compact optical layout can be obtained with a focal length of approximately 4″. In the preferred embodiment, the optical path length from C.R.T. to the film 46 is approximately 16″ with a 4″ focal length. With suitable temperature controls and use of suitable structural material, such as chrome-molybdenum steel tubing for the optics mounting frame, operational temperature changes would only produce a minimum optical path length change so that very little temperature compensation would be required for the 4″ focal length structure. The compactness of the system is evident from the fact that the dual lens optical system permits use of a shorter optical path length for a given lens field angle.

The present optical system is adaptable to various types of installations while remaining simple both in structure and operation. Also, the system introduces a drift and yaw correction in the mapping operation without using complex optical means, such as a K-mirror or prism structure.

It will be obvious that conventional airborne instrumentation, such as an altitude indicator, a true course indicator, true heading indicator, or the like, will be available in the aircraft to feed the necessary information into the pitch correction servo 54, the drift correction servo 48, and the lens servo 66. Servo amplifiers to operate the indicators are found in the aircraft control system, and do not form a part of the present invention. The present optical system, with the drift and pitch servos, include the lens mount with rotational and transverse mechanisms for introducing pitch correction, the rotating mirror 36 which introduces drift correction, and the stationary mirrors 42 and 44 for putting the C.R.T. image on the film 46.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. An optical system for an airborne vehicle to prevent distortions of photographs taken by a radar camera having means for presenting the electrical pulses on a C.R.T. as a non-rotating single line image of variable intensity comprising means for rotating the single line image an amount equal to the vehicle's drift angle, and means for translating the single line image as a function of the vehicle's angle-of-pitch and altitude.

2. An optical system to prevent distortions of an airborne radar camera in which electrical pulses from the radar are presented on a C.R.T. as a non-rotating single line image comprising a pivoted mirror rotatively mounted at a predetermined angle to an axis colinear with the C.R.T. trace, and optical means for translating the line image from said pivoted mirror perpendicular to itself.

3. An optical system as defined in claim 2 in which said optical means include a movable ring assembly having a lens therein, first correction means for rotating said ring assembly as a function of the aircraft's drift angle, and second correction means for translating said lens along a diameter of said ring assembly as a function of the aircraft's pitch.

4. A method of preventing distortions of a radar camera in an aircraft wherein the electrical pulses from the radar camera are presented on a C.R.T. as a non-rotating single line image comprising the steps of rotating the line image projected from the C.R.T. to correct for aircraft drift and yaw, and translating the image before putting it on a film to correct for aircraft pitch.

5. A method as set forth in claim 4, wherein the image is translated in a direction perpendicular to itself.

6. An optical system for an airborne vehicle to prevent distortions of photographs taken by radar cameras comprising at least two radar antennas, each for directing a linearly scanning radar beam toward a particular target area, a cathode ray tube for each radar antenna adapted to display on its face an image corresponding to radar signals received by the radar antenna associated therewith, means for projecting and coordinating the cathode ray tube images on a recording surface, means for predeterminedly rotating each said image to correct for the airborne vehicle's drift and yaw, and means for predeterminedly translating each said image to correct for the airborne vehicle's pitch.

References Cited in the file of this patent

UNITED STATES PATENTS

| | | |
|---|---|---|
| 2,508,562 | Bonner | May 23, 1950 |
| 2,602,923 | Frazier | July 8, 1952 |
| 2,960,906 | Fogel | Nov. 22, 1960 |

FOREIGN PATENTS

| | | |
|---|---|---|
| 620,519 | Great Britain | Mar. 25, 1949 |